(12) United States Patent
Park et al.

(10) Patent No.: US 11,312,264 B2
(45) Date of Patent: Apr. 26, 2022

(54) ESS CHARGING AND DISCHARGING OPERATION METHOD (71) Applicant: HYOSUNG HEAVY INDUSTRIES CORPORATION, Seoul (KR)

(72) Inventors: Sang Hui Park, Anyang-Si (KR); Seo Woo Lee, Yangju-Si (KR)

(73) Assignee: HYOSUNG HEAVY INDUSTRIES CORPORATION, Seoul (KR)

(*) Notice: Subject to any disclaimer, the term of this patent is extended or adjusted under 35 U.S.C. 154(b) by 0 days.

(21) Appl. No.: 16/975,283

(22) PCT Filed: Jul. 10, 2019

(86) PCT No.: PCT/KR2019/008511
§ 371 (c)(1),
(2) Date: Aug. 24, 2020

(87) PCT Pub. No.: WO2020/013614
PCT Pub. Date: Jan. 16, 2020

(65) Prior Publication Data
US 2020/0391613 A1 Dec. 17, 2020

(30) Foreign Application Priority Data
Jul. 11, 2018 (KR) .................. 10-2018-0080805

(51) Int. Cl.
*B60L 58/13* (2019.01)
*H02J 7/00* (2006.01)
(Continued)

(52) U.S. Cl.
CPC .............. *B60L 58/13* (2019.02); *B60L 7/10* (2013.01); *B60L 50/53* (2019.02); *H02J 7/007* (2013.01);
(Continued)

(58) Field of Classification Search
CPC ......... H02J 7/0048; H02J 7/0052; B60L 7/10; B60L 7/007; B60L 58/13; B60L 2200/26; B60L 50/53
(Continued)

(56) References Cited

U.S. PATENT DOCUMENTS

2013/0073125 A1* 3/2013 Araki .................. B60L 50/51
701/19
2013/0147441 A1* 6/2013 Lee .................... B60L 9/005
320/167
(Continued)

FOREIGN PATENT DOCUMENTS

JP 2005-206111 A 8/2005
JP 2009-273218 A 11/2009
(Continued)

*Primary Examiner* — Edward Tso
*Assistant Examiner* — Aaron Piggush
(74) *Attorney, Agent, or Firm* — Novick, Kim & Lee, PLLC; Jae Youn Kim (57) ABSTRACT

An ESS charging and discharging operation method may include the steps of: checking whether SOC of the ESS is within an operable range, and performing an SOC management operation if the SOC of the ESS is not within the operable range; performing, if the SOC of the ESS is within the operable range, a catenary wire voltage control operation based on range of catenary wire voltage and range of variation rate of the catenary wire voltage; performing the SOC management operation after the ESS is charged or discharged depending on the catenary wire voltage control operation over unit time, if output current of the ESS does not exceed current reference value; and stopping the catenary wire voltage control operation and switching the operation to a standby state.

4 Claims, 5 Drawing Sheets

(51) Int. Cl.
*B60L 7/10* (2006.01)
*B60L 50/53* (2019.01)
(52) U.S. Cl.
CPC ......... *H02J 7/0048* (2020.01); *B60L 2200/26* (2013.01)
(58) Field of Classification Search
USPC .......................... 320/132, 134, 156, 159, 164
See application file for complete search history.

(56) References Cited

U.S. PATENT DOCUMENTS

2015/0214761 A1\* 7/2015 Kono ................ H02J 7/007182
320/107
2017/0166085 A1\* 6/2017 Domoto .................. B60L 50/51

FOREIGN PATENT DOCUMENTS

| JP | 2013-123359 A | 6/2013 |
| JP | 6279748 B2 | 2/2018 |
| KR | 10-2012-0100480 A | 9/2012 |
| KR | 10-1224570 B1 | 1/2013 |

\* cited by examiner

ESS CHARGING AND DISCHARGING OPERATION METHOD

FIELD OF THE INVENTION

The present invention relates to a high-efficient energy storage system (ESS) charging and discharging operation method when being used in a train, and more particularly, to the ESS charging and discharging operation method with operating standards that make it easy to update setting values as references upon a system operation and is capable of being used uniformly in various situations or at various places.

BACKGROUND OF THE INVENTION

An energy storage system (ESS) can perform a key role in converting new renewable energy sources actively developed recently to high-quality electricity and connecting the electricity to a power grid. In particular, it is a system required when a wind power station and a solar photovoltaic power plant that show high power variations are connected to such power grid.

A principle of storing energy is to receive electric energy from a power grid, store the energy as ionized, kinetic, physically compressed and chemical energy, and convert the energy to electric energy, if necessary, to supply to the power grid. Medium and large sized energy storage systems can be classified into various types. A lithium-ion (Li) battery with a separator between anode and cathode and an electrolyte, as a representative secondary battery, stores and releases energy when lithium ions travel between anode and cathode electrodes through the electrolyte. Yet, it is still expensive, but thanks to its good output characteristics and efficiency, it is recently applied to a wide range. In particular, a method of configuring a whole ESS with multi-unit battery energy storage systems (BESSs) equipped with Li-ion battery packs for a single-purpose site makes up for demerits in economic efficiency and Li-ion battery life.

Recently, the ESS for regenerative braking for trains draws the attention as a new application of the ESS and it has effects of increasing energy efficiency by storing energy generated and consumed when a train stops and starts, stabilizing catenary wire voltage, and delaying deterioration of relevant facilities.

The ESS for regenerative braking may be directly installed in a train or in a railway substation to be used if necessary.

However, in case of the ESS installed in a railway or a train, as energy efficiency depends on how to store and use energy, an effective control method suitable for a place to install the ESS is required.

Besides, in case of the aforementioned ESS control method, ESS operation standards that make it easy to update setting values as references upon system operation and is capable of being used uniformly in various situations or at various places are required.

DETAILED EXPLANATION OF THE INVENTION

Technical Problems

An object of the present invention is to provide a high-efficient energy storage system (ESS) charging and discharging operation method when being used in a train.

The other object of the present invention is to provide an ESS charging and discharging operation method with ESS operation standards that make it easy to update setting values as references upon system operation and is capable of being used uniformly in various situations or at various places.

Means of Solving the Problem

An ESS charging and discharging operation method in accordance with one aspect of the present invention may comprise steps of: checking whether SOC of the ESS is within an operable range and performing an SOC management operation if the SOC of the ESS is not within the operable range; performing, if the SOC of the ESS is within the operable range, catenary wire voltage control operation based on range of catenary wire voltage and range of variation rate of the catenary wire voltage; and stopping the catenary wire voltage control operation and switching the operation to a standby state, after the ESS is charged or discharged depending on the catenary wire voltage control operation over unit time, if output current of the ESS does not exceed a current reference value.

Herein, the method may further comprise a step of setting at least one of the catenary wire voltage, the variation rate of the catenary wire voltage, the output current of the ESS, and an SOC reference value of the ESS.

The ESS charging and discharging operation method in accordance with another aspect of the present invention may comprise steps of: acquiring a catenary wire voltage value; discharging the ESS if the catenary wire voltage value does not exceed a first voltage reference value, and charging the ESS if the catenary wire voltage does not exceed a second voltage reference value; acquiring the variation rate of the catenary wire voltage if the catenary wire voltage value is between the first voltage reference value and the second voltage reference value; discharging the ESS if the variation rate of the catenary wire voltage does not exceed a first variation rate reference value and the catenary wire voltage value does not exceed a center reference value; stopping the ESS if the variation rate of the catenary wire voltage does not exceed the first variation rate reference value and the catenary wire voltage value exceeds the center reference value; charging the ESS if the variation rate of the catenary wire voltage exceeds a second variation rate reference value and the catenary wire voltage value exceeds the center reference value; stopping the ESS if the variation rate of the catenary wire voltage exceeds the first variation rate reference value and the catenary wire voltage value does not exceed the center reference value; and stopping the ESS if the variation rate of the catenary wire voltage is between the first variation rate reference value and the second variation rate reference value. The method may further comprise a step of updating all or some of the first variation rate reference value, the second variation rate reference value, the first voltage reference value, the second voltage reference value, and the center reference value from a result of the acquired ESS charging and discharging operation during a unit monitoring period.

Effects of the Invention

An ESS charging and discharging operation method of the present invention as explained above has a benefit of making an ESS increasing energy efficiency for regenerative braking for a train or a railway substation.

The ESS charging and discharging operation method of the present invention has another benefit of having ESS operation standards that make it easy to update setting values as references upon system operation and is capable of being used uniformly in various situations or at various places.

The ESS charging and discharging operation method of the present invention also has a benefit of maximizing energy utilization upon a charging or discharging operation.

DETAILED DESCRIPTION OF THE PREFERRED EMBODIMENTS

Detailed example embodiments to implement the present invention will be explained below by referring to attached drawings.

Upon explanation of the present invention, terms such as "a first," "a second," etc. may be used to explain a variety of components but the components may not be limited by such terms. The terms are used only for the purpose of distinguishing one component from another. For example, a first component may be named as a second component without being beyond the scope of the right of the present invention and similarly, even a second component may be named as a first one.

If it is mentioned that a component is connected or linked to another component, it may be understood that the component may be directly connected or linked to the another component but also a third component may exist in between them.

The terms used in this specification are used only to explain specific example embodiments and they are not intended to limit the present invention. Unless a context clearly indicates a different meaning, any reference to singular may include plural ones.

In this specification, it may be understood: that terms such as "include," or "equip" are intended to designate that features, numbers, steps, movements, components, parts, or their combinations exist; and that existence or addibility of one or more other features, numbers, steps, movements, components, parts, or their combinations are not excluded in advance.

Besides, shapes, sizes, etc. of elements in drawings may be exaggerated for clearer explanation.

Figure 1:
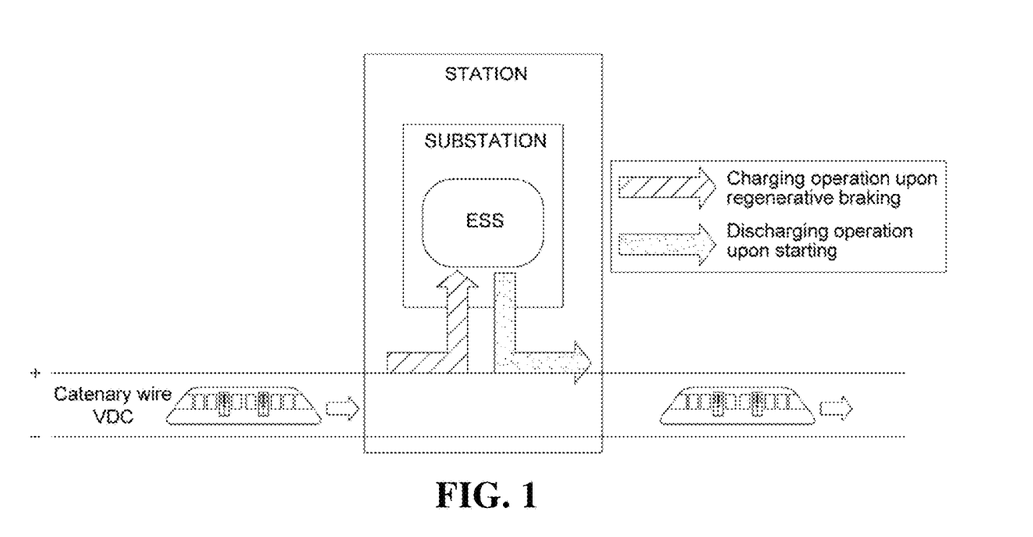
FIG. 1 is a concept diagram illustrating a railway system which an ESS charging and discharging operation method in accordance with one example embodiment of the present invention is performed.

FIG. 1 is a concept diagram illustrating a railway system to which an ESS in accordance with one example embodiment of the present invention is applied.

As illustrated in FIG. 1, a railway system to which the ESS in accordance with one example embodiment of the present invention is applied allows a train to receive power and be operated by providing received power provided from a railway substation or a station to catenary wire electrically connected to the train. The illustrated ESS may store power received from the catenary wire or supply the stored power to the catenary wire.

At an electrified railway section (including high-speed rail), multiple substations may be installed and each substation is responsible for supplying power to each zone (i.e., their responsible catenary section) and each substation has each zone into which the section is divided. As demanded power is different by each substation because the number of trains running and their operation time are different depending on each zone that each substation is in charge of, each substation or station may have one ESS.

Figure 2:
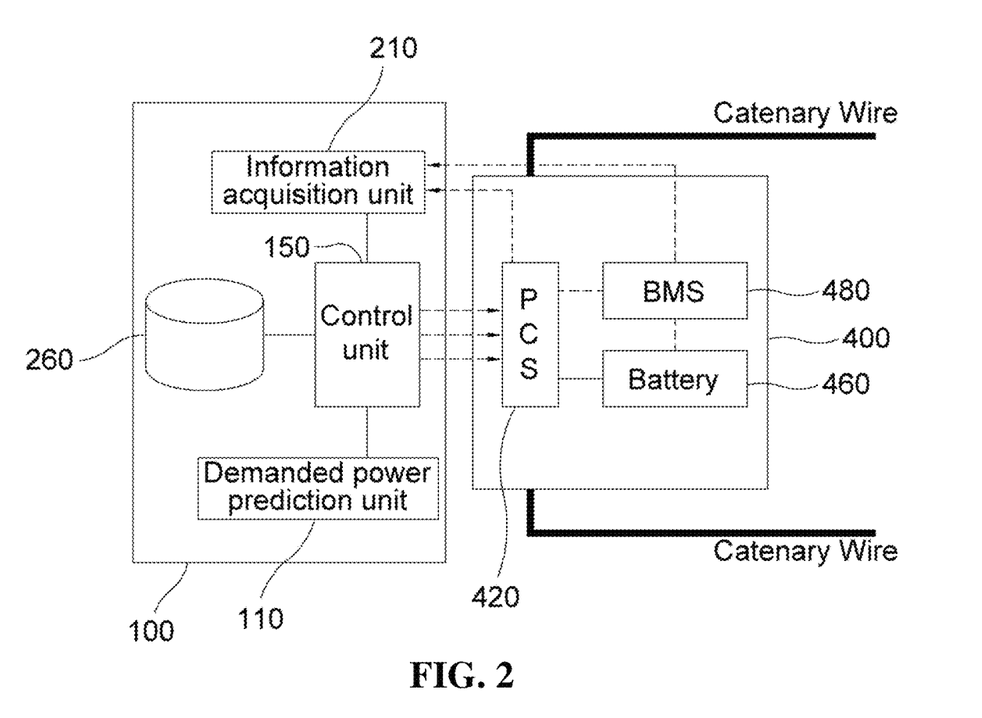
FIG. 2 is a block diagram illustrating an ESS operating apparatus that performs an ESS charging and discharging operation method in accordance with one example embodiment of the present invention.

FIG. 2 is a block diagram illustrating an ESS operating apparatus 100 and an ESS 400 together in accordance with one example embodiment of the present invention. In the drawing, the ESS operating apparatus 100 is placed separately from the ESS 400, but in another example embodiment, the ESS operating apparatus 100 of the present invention may be placed in the ESS 400.

The illustrated ESS operating apparatus 100 may include: an information acquisition unit 210 for acquiring information on electrical properties of the catenary wire to which power is inputted and outputted, information on output of a PCS of the ESS 400, and information on (charging) status of a battery 460; a control unit 150 for performing the ESS charging and discharging operation in accordance with the thought of the present invention; a storage unit 260 for storing whole or part of information acquired by the information acquisition unit 210 and information on the ESS charging and discharging operation; and a demanded power prediction unit 110 for predicting demanded power of a train.

A PCS 420 of the illustrated ESS is connected to catenary wire but the PCS 420 may equip a converter for properly converting the power of the battery 460 to outside.

The information acquisition unit 210 may directly detect electrical properties (such as voltage, current, etc.) of the catenary wire (catenary end) or predict electrical properties of the catenary end from information on monitoring electrical properties of an input end and an output end of the PCS 420 of the ESS 400 (or an input end and an output end of the converter).

The information acquisition unit 210 may receive the information on the status of the battery 460 from BMS 480 of the ESS 400, directly detect the electrical properties (such as voltage, current, etc.) of the catenary end, or predict the charging status of the battery 460 from the information on monitoring the electrical properties of the input end and the output end of the PCS 420 of the ESS 400 (or the input end and the output end of the converter).

Herein, the information on the charging status may include Status of Charge (SOC) and maximum charging capacity, and further include State of Health (SOH), etc.

The information acquisition unit 210 may calculate information on power demand for load connected to a catenary system, i.e., information on power consumption status, by computing the electrical properties (such as voltage, current, etc.) detected at points in a power supply line to the catenary system or the load.

Information acquired by the information acquisition unit 210 may be stored in a separate storage unit, not illustrated, and be used to monitor relatively for a long period of time or draw patterns. For example, the SOC and the maximum charging capacity of the ESS 400 measured at a certain cycle (a monitoring time interval) may be stored in the storage unit.

The demanded power prediction unit 110 may predict demanded power per time of day in a power supply section of a railway substation by using a power consumption pattern of a train equipped with the ESS and/or a train diagram in the railway section to which the train should supply power.

To predict demanded power, the demanded power prediction unit 110 may prepare database where the power consumption pattern of each railway substation by time is stored and also database where the train diagram in the railway section (i.e., the power supply section) of each railway substation is stored.

Meanwhile, the demanded power prediction unit 110 may draw a relationship between power consumption per time of day and train operation by matching the power consumption per time of day with the train operation information using the database where the power consumption pattern of the train by time has been stored and the database where the train diagram has been stored. For this end, the demanded power prediction unit 110 may have a program which implements an information processing algorithm of: matching the power consumption per time of day with the train operation information and predicting consumption according to the result.

In the storage unit 260, the database for the train operation information may also be stored and the ESS charging and discharging operation in accordance with the thought of the present invention and history data of the results (i.e., monitoring data of the ESS operation results for a certain period of time) may be stored.

The control unit 150 may determine charging and discharging time intervals by demanded power per time during a certain period of time (e.g., a day) and operate the ESS 400 with a mode specified for a relevant time interval to make charging and discharging operation of the battery 460 in the ESS 400.

By comparing actually demanded power acquired from the values of measuring electrical properties of the relevant railway section to pre-specified reference power, the control unit 150 may discharge the ESS 400 if the demanded power exceeds the reference power and charge the ESS 400 if falls short of the reference power. For this end, the control unit 150 may receive required information from the information acquisition unit 210 and/or the BMS 480 of the ESS.

The control unit 150 performs the ESS charging and discharging operation in accordance with the thought of the present invention.

Figure 3:
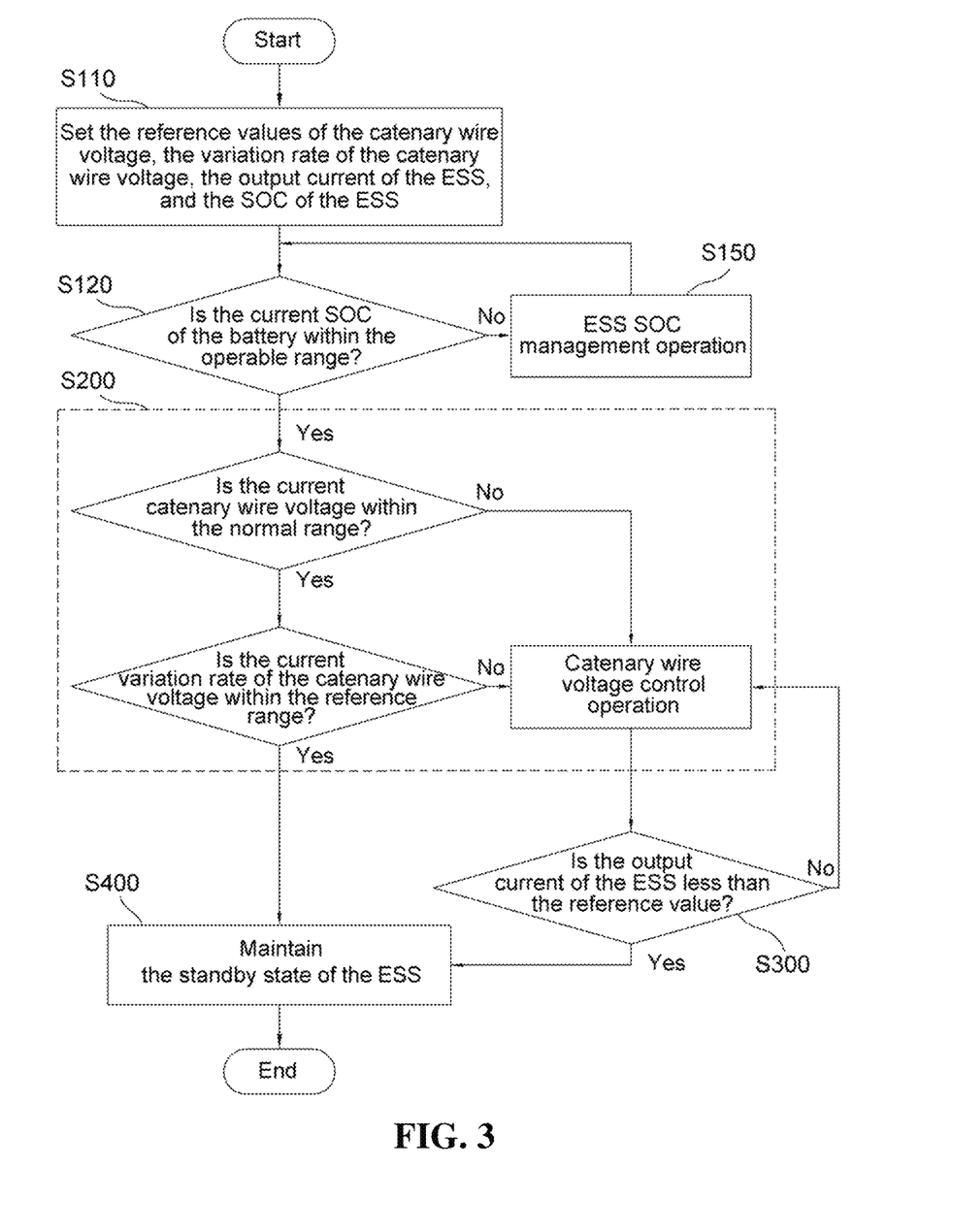
FIG. 3 is a flowchart illustrating an ESS charging and discharging operation method in accordance with one example embodiment of the present invention.

FIG. 3 illustrates an ESS charging and discharging operation method in accordance with one example embodiment of the present invention. The illustrated ESS charging and discharging operation method comprises steps of: checking whether a SOC of the ESS is within an operable range at S210 and performing SOC management operation if the SOC of the ESS is not in the operable range at S150; performing, if the SOC of the ESS is within the operable range, catenary wire voltage control operation based on range of catenary wire voltage and range of variation rate of the catenary wire voltage at S200; and after the ESS is charged or discharged depending on the catenary wire voltage control operation per unit time, if output current of the ESS does not exceed current reference value at S300, stopping the catenary wire voltage control operation and switching the operation to a standby state at S400.

In accordance with the example embodiment, it may further include a step 110 of setting the catenary wire voltage, the variation rate of the catenary wire voltage, the output current of the ESS, and SOC reference value of the ESS, etc.

In the flowchart, the step S110 of setting the reference value is illustrated to be first performed, but it may be performed in a form of setting the ESS charging and discharging operations (more specifically, catenary wire voltage control operations) accumulated for a long time in the present invention and the catenary wire voltages (and the reference values), the variation rates of the catenary wire voltage (and the reference values), ESS output currents, ESS SOC reference values, etc. updated from the results.

The step 120 of checking if a SOC of the ESS is within an operable range may be performed by an algorithm for various techniques known to the public in the BMS in FIG. 2. For example, the charge level of the batter may be calculated as the SOC calculated from the voltage and the current of the output end of the ESS. In accordance with the example embodiment, SOH as an indication of the point which has been reached the life cycle of the battery may be reflected in addition to the SOC.

In the illustrated flowchart, if the output current of the ESS (more specifically, the output current of the converter of the ESS) does not exceed the current reference value, a regenerative braking area or an acceleration area may be considered to have ended. Therefore, the catenary wire voltage control operation of the ESS may be stopped. In other words, the catenary wire voltage control operation is stopped and the operation is maintained at the standby state for a next operation depending on the catenary wire voltage and the variation rate.

The SOC management operation S150 refers to operation with the charging level of the ESS set to perform the ESS charging and discharging operation suitable for the regenerative braking and acceleration operations of the train. For example, if the SOC of the battery is too high, regenerative energy generated from the regenerative braking of the train cannot be stored in the ESS. Therefore, the power stored in the battery is consumed through bypass resistances or delivered to the catenary wire. If the SOC of the battery is too low, energy required for acceleration may not be supported at an acceleration area and the battery may be completely discharged. Therefore, the power is supplied from the catenary wire or a substation facility and stored in the battery.

Figure 4:
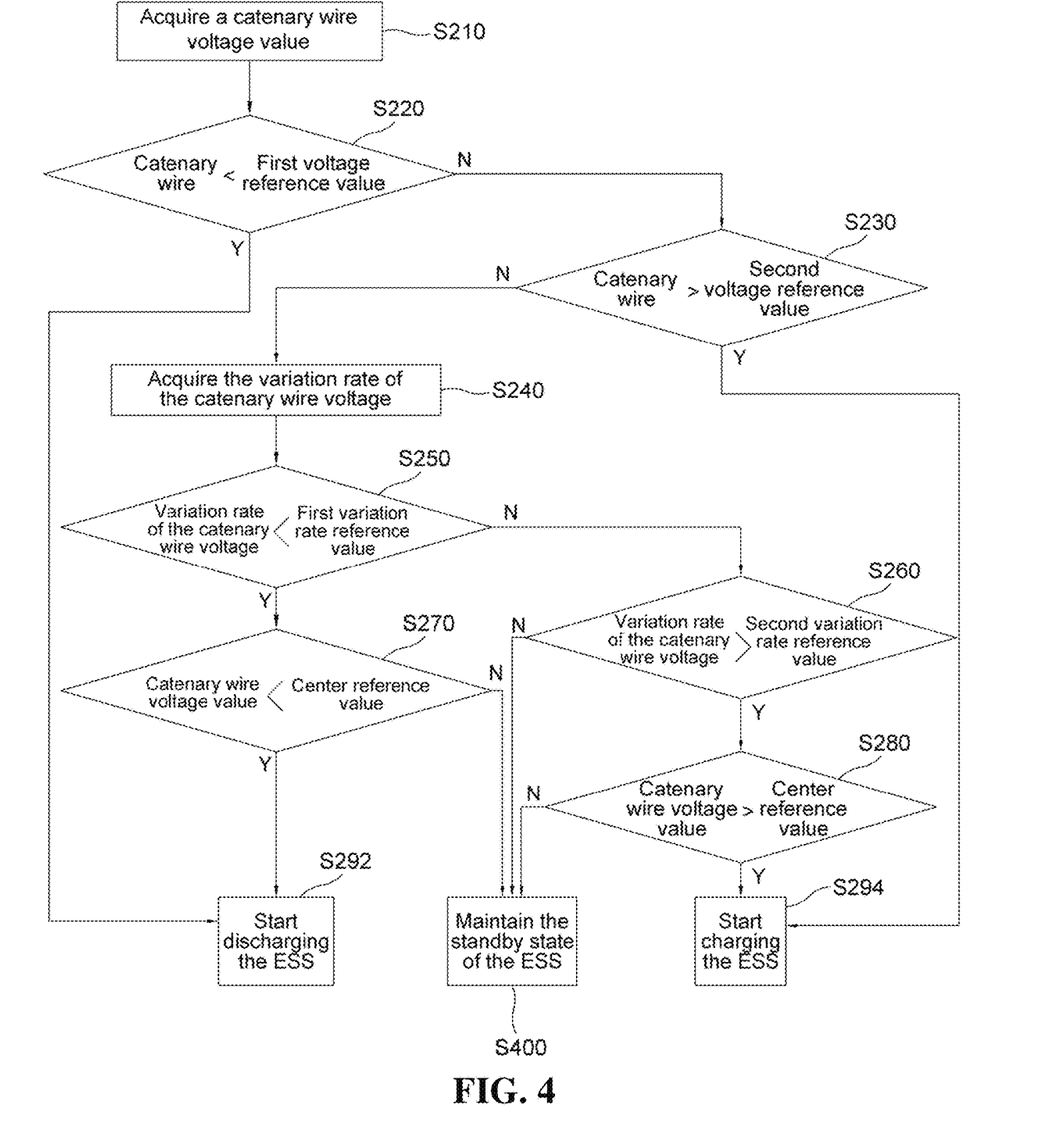
FIG. 4 is a flowchart specifically illustrating a catenary wire voltage control operation in the charging and discharging operation method as illustrated in FIG. 3.

In the illustrated ESS charging and discharging operation method, a step of performing the catenary wire voltage control operation based on the range of the catenary wire voltage and the range of the variation rate of the catenary wire voltage (i.e., S200 in FIG. 3) is illustrated in FIG. 4.

As the catenary wire voltage control operation of the ESS illustrated, the ESS charging and discharging operation method may comprise steps of: acquiring a catenary wire voltage value at S210; starting discharging the ESS at S292 if the catenary wire voltage value does not exceed a first voltage reference value at S220, and starting charging the ESS at S294 if the catenary wire voltage does not exceed a second voltage reference value; acquiring the variation rate of the catenary wire voltage at S240 if the catenary wire voltage value is between the first voltage reference value and the second voltage reference value at S220, S230; starting discharging the ESS at S292 if the variation rate of the catenary wire voltage does not exceed a first variation rate reference value at S250 and the catenary wire voltage value does not exceed a center reference value at S290; maintaining the standby state of the ESS at S400 if the variation rate of the catenary wire voltage does not exceed the first variation rate reference value at S250 and the catenary wire voltage value exceeds the center reference value; starting charging the ESS at S294 if the variation rate of the catenary wire voltage exceeds a second variation rate reference value at S260 and the catenary wire voltage value exceeds the center reference value at S280; maintaining the standby state of the ESS at S400 if the variation rate of the catenary wire voltage exceeds the first variation rate reference value at S260 and the catenary wire voltage value does not exceed the center reference value; and maintaining the standby state of the ESS at S400 if the variation rate of the catenary wire voltage is between the first variation rate reference value and the second variation rate reference value.

Meanwhile, in accordance with an example embodiment, it may further comprise a step, even though not being illustrated in FIG. 3 and FIG. 4, of updating the first variation rate reference value and the second variation rate reference value from the acquired result of the ESS charging and discharging operation during a unit monitoring period. In addition, the first voltage reference value, the second voltage reference value and the center reference value may be updated depending on the catenary wire situation of an installation site.

For example, if it is determined that charging and discharging operations are switched too frequently from the result of the acquired ESS charging and discharging operation, reference values may be updated to widen the gap between the first variation rate reference value and second variation rate reference value and/or between the first voltage reference value and the second voltage reference value.

Generally, because charging or discharging based on catenary wire voltage value is widely used, one of various updating methods in accordance with the prior art may be applied as the method of updating the first voltage reference value and the second voltage reference value of the catenary wire voltage value.

On the contrary, the variation rate of the catenary wire voltage is an ESS charging or discharging control parameter suggested by the present invention. To update the first variation rate reference value and the second variation rate reference value of the catenary wire voltage, a method as described below may be used.

For example, if ultrashort-term ESS charging and discharging operations based on the variation rate within the reference time occur for more than a specified number of times, the first variation rate value shall be reduced and the second variation rate value shall be increased.

Figure 5:
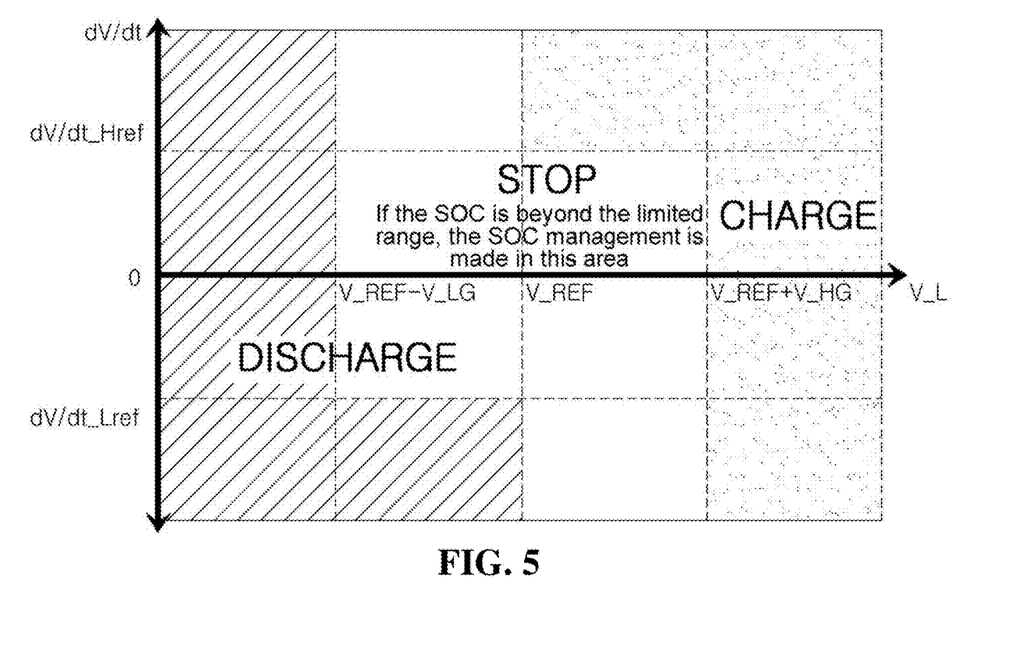
FIG. 5 is a concept diagram for explaining reference values of the charging and discharging operation in accordance with the thought of the present invention.

FIG. 5 illustrates the reference range of the ESS control operation when the catenary wire voltage control operation at S200 in FIG. 2 is performed based on the range of the catenary wire voltage and the variation rate of the catenary wire voltage in accordance with the thought of the present invention.

The range of the catenary wire voltage which makes catenary wire voltage control operation performed in the drawing is less than the first voltage reference value (V_Ref−V_LG) or greater than the second voltage reference value (V_Ref+V_HG). More specifically, if the catenary wire voltage is less than the first voltage reference value (V_Ref−V_LG), discharging is considered and if the catenary wire voltage is greater than the second voltage reference value (V_Ref+V_HG), charging is considered.

In the drawing, the reference range of the catenary wire voltage which makes the catenary wire voltage control operation performed is less than the first variation rate reference value (dV/dt_Lref) or greater than the second variation rate reference value (dV/dt_Href). More specifically, if the variation rate of the catenary wire voltage is less than the first variation rate reference value (dV/dt_Lref), discharging is considered, and if the variation rate of the catenary wire voltage is the second variation rate reference value (dV/dt_Href), charging is considered. However, it can be found in the drawing that the range of the catenary wire voltage is applied in priority over the reference range of the variation rate of the catenary wire voltage.

By the way, it can be found that a condition of stopping the catenary wire voltage control operation of the ESS in the drawing includes a case that the variation rate of the catenary wire voltage does not exceed the first variation rate reference value (dV/dt_Lref) and the catenary wire voltage value exceeds the center reference value (V_Ref). Similarly, a condition of stopping the catenary wire voltage control operation of the ESS in the drawing includes a case that the variation rate of the catenary wire voltage exceeds the second variation rate reference value (dV/dt_Href) and the catenary wire voltage value does not exceed the center reference value (V_Ref).

Herein, the center reference value (V_Ref) accurately does not mean the median value of the first voltage reference value (V_Ref−V_LG) and the second voltage reference value (V_Ref+V_HG), but upon the determination of the regenerative braking and acceleration operations of the train, it means the reference value of the catenary wire voltage with which it is determined that the operation is considered neutral, instead of the regenerative braking and acceleration operations.

Given the aforementioned situation from the viewpoint of performing the catenary wire voltage control operation, the charging or discharging operation is determined preferentially based on the catenary wire voltage value. If the voltage is greatly reduced so that the variation rate of the catenary wire voltage does not exceed the first variation rate reference value (dV/dt_Lref), the area is predetermined as acceleration and if the catenary wire voltage is just less than the center reference value (V_Ref), even though it exceeds the first reference voltage value (V_Ref−V_LG), the discharging operation for the catenary wire is performed.

Similarly, if the voltage is greatly increased so that the variation rate of the catenary wire voltage exceeds the second variation rate reference value (dV/dt_Href), it is predetermined as regenerative braking and if the catenary wire voltage is just greater than the center reference value (V_Ref), even though it does not exceed the second reference voltage value (V_Ref+V_HG), the discharging operation for the catenary wire is performed.

It must be noted that the aforementioned example embodiments are just for explanation and not for limitation. In addition, those skilled in the art to which the present invention pertains could understand that various example embodiments may be formed in the scope of the technical idea of the present invention.

REFERENCE NUMERALS

100: ESS operating apparatus
110: Demanded power prediction unit
150: Control unit
210: Information acquisition unit
260: Storage unit
400: ESS

INDUSTRIAL AVAILABILITY

The present invention relates to a high energy efficient ESS charging and discharging operation method and it is available in a field of ESS.

What is claimed is:

1. An energy storage system (ESS) charging and discharging operation method, comprising:
   (a) checking whether a status of charge (SOC) of the ESS is within an operable range and performing an SOC management operation if the SOC of the ESS is not within the operable range;
   (b) performing, if the SOC of the ESS is within the operable range, a catenary wire voltage control operation based on a range of catenary wire voltage and a range of variation rate of the catenary wire voltage; and
   (c) stopping the catenary wire voltage control operation and switching the SOC management operation to a standby state, after the ESS is charged or discharged depending on the catenary wire voltage control operation per a unit time, if an output current of the ESS does not exceed a current reference value,
   wherein the operable range is a charging level of the ESS set to perform an ESS charging and discharging operation suitable for regenerative braking and acceleration operations of a train,
   wherein the performing of the catenary wire voltage control operation includes:
   acquiring a catenary wire voltage value;
   starting discharging the ESS if the catenary wire voltage value does not exceed a first voltage reference value, and starting charging the ESS if the catenary wire voltage does not exceed a second voltage reference value;
   acquiring the variation rate of the catenary wire voltage if the catenary wire voltage value is between the first voltage reference value and the second voltage reference value;
   starting discharging the ESS if the variation rate of the catenary wire voltage does not exceed a first variation rate reference value and the catenary wire voltage value does not exceed a center reference value;
   maintaining the standby state of the ESS if the variation rate of the catenary wire voltage does not exceed the first variation rate reference value and the catenary wire voltage value exceeds the center reference value;
   starting charging the ESS if the variation rate of the catenary wire voltage exceeds a second variation rate reference value and the catenary wire voltage value exceeds the center reference value;
   maintaining the standby state of the ESS if the variation rate of the catenary wire voltage exceeds the first variation rate reference value and the catenary wire voltage value does not exceed the center reference value; and
   maintaining the standby state of the ESS if the variation rate of the catenary wire voltage is between the first variation rate reference value and the second variation rate reference value.

2. The method of claim 1, further comprising setting at least one of the catenary wire voltage, the variation rate of the catenary wire voltage, the output current of the ESS, and an SOC reference value of the ESS.

3. An energy storage system (ESS) charging and discharging operation method, comprising:
   acquiring a catenary wire voltage value;
   starting discharging the ESS if the catenary wire voltage value does not exceed a first voltage reference value, and starting charging the ESS if the catenary wire voltage does not exceed a second voltage reference value;
   acquiring a variation rate of the catenary wire voltage if the catenary wire voltage value is between the first voltage reference value and the second voltage reference value;
   starting discharging the ESS if the variation rate of the catenary wire voltage does not exceed a first variation rate reference value and the catenary wire voltage value does not exceed a center reference value;
   maintaining a standby state of the ESS if the variation rate of the catenary wire voltage does not exceed the first variation rate reference value and the catenary wire voltage value exceeds the center reference value;
   starting charging the ESS if the variation rate of the catenary wire voltage exceeds a second variation rate reference value and the catenary wire voltage value exceeds the center reference value;
   maintaining the standby state of the ESS if the variation rate of the catenary wire voltage exceeds the first variation rate reference value and the catenary wire voltage value does not exceed the center reference value; and
   maintaining the standby state of the ESS if the variation rate of the catenary wire voltage is between the first variation rate reference value and the second variation rate reference value.

4. The method of claim 3, further comprising:
   updating all or some of the first variation rate reference value, the second variation rate reference value, the first voltage reference value, the second voltage reference value, and the center reference value from a result of an acquired ESS charging and discharging operation during a unit monitoring period.

* * * * *